(12) United States Patent
Asano et al.

(10) Patent No.: US 7,232,088 B2
(45) Date of Patent: Jun. 19, 2007

(54) REEL AND RECORDING TAPE CARTRIDGE

(75) Inventors: Katsuki Asano, Kanagawa (JP); Seiji Tsuyuki, Kanagawa (JP); Ren Ishikawa, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/504,731

(22) Filed: Aug. 16, 2006

(65) Prior Publication Data

US 2007/0051845 A1   Mar. 8, 2007

(30) Foreign Application Priority Data

Aug. 16, 2005   (JP) .............................. 2005-235833

(51) Int. Cl.
*G03B 23/02* (2006.01)

(52) U.S. Cl. .................... 242/348; 242/613; 242/614

(58) Field of Classification Search ................ 242/348, 242/348.2, 614, 608, 608.2, 608.6, 608.8, 242/613, 613.1, 613.2

See application file for complete search history.

(56) References Cited

U.S. PATENT DOCUMENTS

| | | | | |
|---|---|---|---|---|
| 1,868,719 A | * | 7/1932 | Payne ..................... | 242/608.8 |
| 2,799,458 A | * | 7/1957 | Nye | |
| 3,041,005 A | * | 6/1962 | Wallace ..................... | 242/614 |
| 3,622,095 A | * | 11/1971 | Turner ..................... | 242/613.2 |
| 5,054,709 A | * | 10/1991 | Sato ......................... | 242/614 |
| 5,509,620 A | * | 4/1996 | Crews ....................... | 242/608 |
| 6,390,411 B1 | * | 5/2002 | Chal et al. ................ | 242/613.2 |
| 6,474,582 B2 | * | 11/2002 | Zwettler et al. ......... | 242/348.2 |
| 6,866,222 B2 | * | 3/2005 | Varela ....................... | 242/613.2 |
| 2003/0122029 A1 | * | 7/2003 | Varela ..................... | 242/613.2 |

FOREIGN PATENT DOCUMENTS

| | | |
|---|---|---|
| JP | 2004-14022 A | 1/2004 |
| JP | 2004-14023 A | 1/2004 |

\* cited by examiner

*Primary Examiner*—William A. Rivera
(74) *Attorney, Agent, or Firm*—Sughrue Mion, PLLC (57) ABSTRACT

A reel comprises a hub onto which recording tape is wound and a flange that is disposed on an end portion of the hub and retains a width-direction end portion of the recording tape, wherein plural cutout portions that locally divide the hub and the flange are formed in the flange. The cross section of the hub in plan view has a substantially equilateral triangular shape and positions where constricting force resulting from the tape reaches a maximum are caused to protrude in advance.

11 Claims, 6 Drawing Sheets

REEL AND RECORDING TAPE CARTRIDGE

CROSS-REFERENCE TO RELATED APPLICATION

This application claims priority under 35 USC 119 from Japanese Patent Application No. 2005-235833, the disclosure of which is incorporated by reference herein.

BACKGROUND OF THE INVENTION

1. Field of the Invention

The present invention relates to a reel onto which recording tape such as magnetic tape is wound and to a recording tape cartridge disposed with the reel.

2. Description of the Related Art

As external storage media for computers and the like, recording tape cartridges are known which house a reel wound with magnetic tape inside a case. The reel includes a hub, which configures the axial center portion of the recording tape cartridge and on whose outer periphery the magnetic tape is wound, and an upper flange and a lower flange, which protrude outward in the radial direction from both axial line-direction ends of the hub.

Recording tape cartridges are also known where recording tape such as magnetic tape is wound onto a single reel and which rotatably house the reel inside a case made of synthetic resin. A leader member, such as a leader pin, a leader tape, or a leader block, is disposed on the leading end of the recording tape. Pullout means disposed in a drive device pull out the leader member through an opening in the recording tape cartridge, and the recording tape fixed to the leader member is wound onto a take-up reel of the drive device.

In the reels of such recording tape cartridges, the recording tape is ordinarily wound onto the outer peripheral surface of the hub. The upper flange and the lower flange are disposed above and below the hub, and the position of the recording tape in the vertical direction when the recording tape is wound is regulated by the upper and lower flanges, whereby the recording tape is retained such that the winding is good, the traveling stability of the recording tape is improved, and damage to the recording tape from the outside is prevented when the recording tape is not in use.

Figure 6:
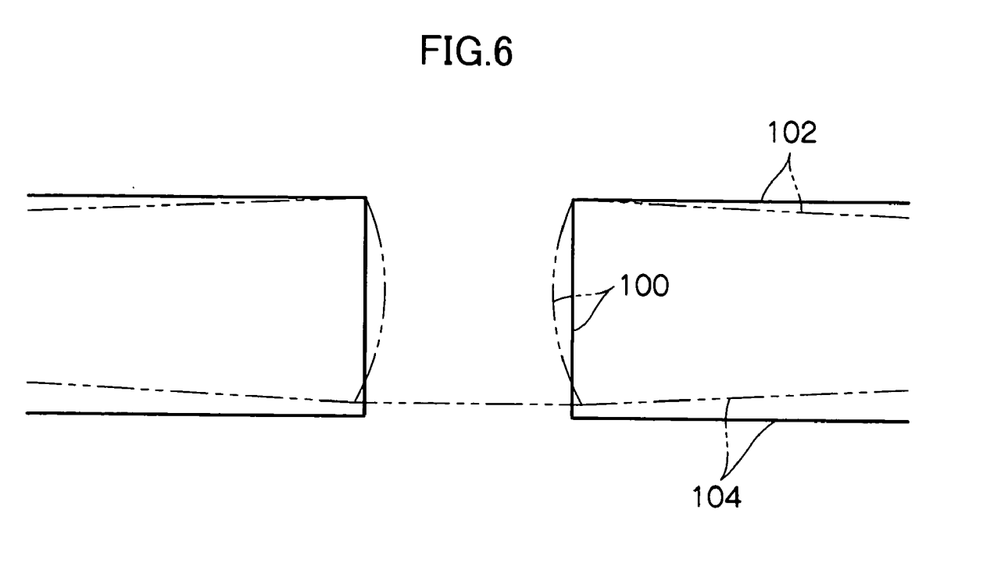
FIG. 6 is an explanatory diagram showing the deformed state of a conventional reel.

However, because the hub is molded with resin, sometimes, as shown in FIG. 6, the substantially central portion of a hub 100 becomes bent inward due to constriction caused by the recording tape being tightly wound onto the hub 100. Additionally, in accompaniment therewith, the distance between an upper flange 102 and a lower flange 104 disposed on both end portions of the hub 100 gradually becomes narrower toward the outer peripheries of the upper flange 102 and the lower flange 104, and there is the potential for the edge portions of the recording tape (not shown) to sustain damage.

For this reason, as disclosed in Japanese Patent Application Laid-open (JP-A) Nos. 2004-14022 and 2004-14023, a configuration that reinforces the hub with a metallic ring-like member in order to prevent deformation of the hub is conceivable, but the manufacturing cost ends up increasing.

SUMMARY OF THE INVENTION

The present invention inexpensively obtains a reel that reduces deformation resulting from the winding pressure and the like of recording tape and a recording tape cartridge disposed with the reel.

A first aspect of the invention provides a reel comprising a hub onto which recording tape is wound, and a flange that is disposed on an end portion of the hub and retains a width-direction end portion of the recording tape, wherein plural cutout portions that locally divide the hub and the flange are formed in the flange.

According to the above aspect, the plural cutout portions that locally divide the hub and the flange are formed in the flange that retains the width-direction end portion of the recording tape.

Constricting force resulting from the recording tape being tightly wound acts on the hub, but it becomes difficult for the constricting force to be transmitted to the flange because the hub and the flange are locally divided by the cutout portions formed in the flange. Accordingly, deformation of the flange can be deterred. Further, the manufacturing cost will not increase because the cutout portions are simply formed in the flange.

A second aspect of the invention provides a reel comprising a hub onto which recording tape is wound, and a flange that is disposed on an end portion of the hub and retains a width-direction end portion of the recording tape, wherein plural thin-walled portions, at which the thickness of portions is reduced, are formed in the flange at a location where the hub and the flange are connected to each other.

According to the above aspect, the plural thin-walled portions at which the thickness of the portions is reduced at a location where the hub and the flange are connected to each other are formed in the flange. Thus, it becomes difficult for the constricting force acting on the hub as a result of the recording tape being tightly wound to be transmitted to the flange, and deformation of the flange can be deterred. Further, the manufacturing cost will not increase because the thin-walled portions are simply formed in the flange.

In the first aspect, the reel may be configured such that the cross section of the hub in plan view has a substantially regular polygonal shape, corner portions of the substantially regular polygon are rounded, and the cutout portions are disposed at positions in the flange corresponding to the corner portions.

In the second aspect, the reel may be configured such that the cross section of the hub in plan view has a substantially regular polygonal shape, corner portions of the substantially regular polygon are rounded, and the thin-walled portions are disposed at positions in the flange corresponding to the corner portions.

It is difficult to mold a perfect circle when the cross section of the hub in plan view has a circular cylinder shape, for example. In the present invention, the cross section of the hub in plan view is formed in a substantially regular polygonal shape, so that the shape of the hub can be brought close to a circular cylinder shape from a polygonal cylinder shape by the constricting force of the recording tape at the outer surface of the hub. Thus, bending deformation of the central portion of the hub can be deterred.

Moreover, by rounding the corner portions of the hub, the recording tape wound onto the hub can be prevented from being damaged by the corner portions. Further, by disposing the cutout portions or the thin-walled portions at positions in the flange corresponding to the corner portions, deformation of the flange is also deterred because it becomes difficult for the constricting force of the recording tape acting on the corner portions of the hub to be transmitted to the flange.

In the first or second aspects, the cross section of the hub in plan view may be a substantially equilateral triangular shape.

Experientially, the constricting force resulting from the recording tape being tightly wound reaches a substantial maximum at three points positioned equidistantly in the circumferential direction of the hub. For this reason, in the present invention, the cross section of the hub in plan view is formed in a substantially equilateral triangular shape, and the positions where the constricting force resulting from the recording tape reaches a maximum are caused to protrude in advance to counteract deformation of the hub resulting from the constricting force. In other words, the shape of the hub is brought close to a circular cylinder shape from the substantially equilateral triangular shape by the constricting force of the magnetic tape. Thus, bending deformation of the central portion of the hub can be deterred.

A third aspect of the invention provides a recording tape cartridge comprising a reel that includes a hub onto which recording tape is wound, a flange that is disposed on an end portion of the hub and retains a width-direction end portion of the recording tape, and plural cutout portions that are formed in the flange and locally divide the hub and the flange.

A fourth aspect of the invention provides a recording tape cartridge comprising a reel that includes a hub onto which recording tape is wound, a flange that is disposed on an end portion of the hub and retains a width-direction end portion of the recording tape, and plural thin-walled portions that are formed in the flange and at which the thickness of portions is reduced at a location where the hub and the flange are connected.

The recording tape cartridge of the present invention includes, in the flange of the reel, the plural cutout portions or the plural thin-walled portions is provided. The plural cutout portions locally divide the hub and the flange and in the plural thin-walled portions, the thickness of the portions is reduced in the location where the hub and the flange are connected. Accordingly, it becomes difficult for the constricting force acting on the hub as a result of the recording tape being tightly wound to be transmitted to the flange. Thus, deformation of the flange can be deterred, and the width-direction end portions of the recording tape can be prevented from being damaged by a deformed flange. Further, the manufacturing cost also does not increase because the cutout portions or the thin-walled portions are simply formed in the flange.

BRIEF DESCRIPTION OF THE DRAWINGS

An embodiment of the present invention will be described in detail based on the following figures, wherein.

DETAILED DESCRIPTION OF THE INVENTION

A reel 10 pertaining to an embodiment of the present invention will be described on the basis of FIG. 1 to FIGS. 4A and 4B. First, the overall configuration of a recording tape cartridge 12 to which the reel 10 is applied will be described, and then the reel 10 will be described in detail. For the sake of convenience, the direction indicated by arrow A, which is a direction in which the recording tape cartridge 12 is loaded into a drive device, will be referred to as the front direction (front side), the direction indicated by arrow B, which is orthogonal to the direction of arrow A, will be referred to as the right direction, and the direction indicated by arrow C, which is orthogonal to the direction of arrow A, will be referred to as the up direction.

(Configuration of the Recording Tape Cartridge)

Figure 1:
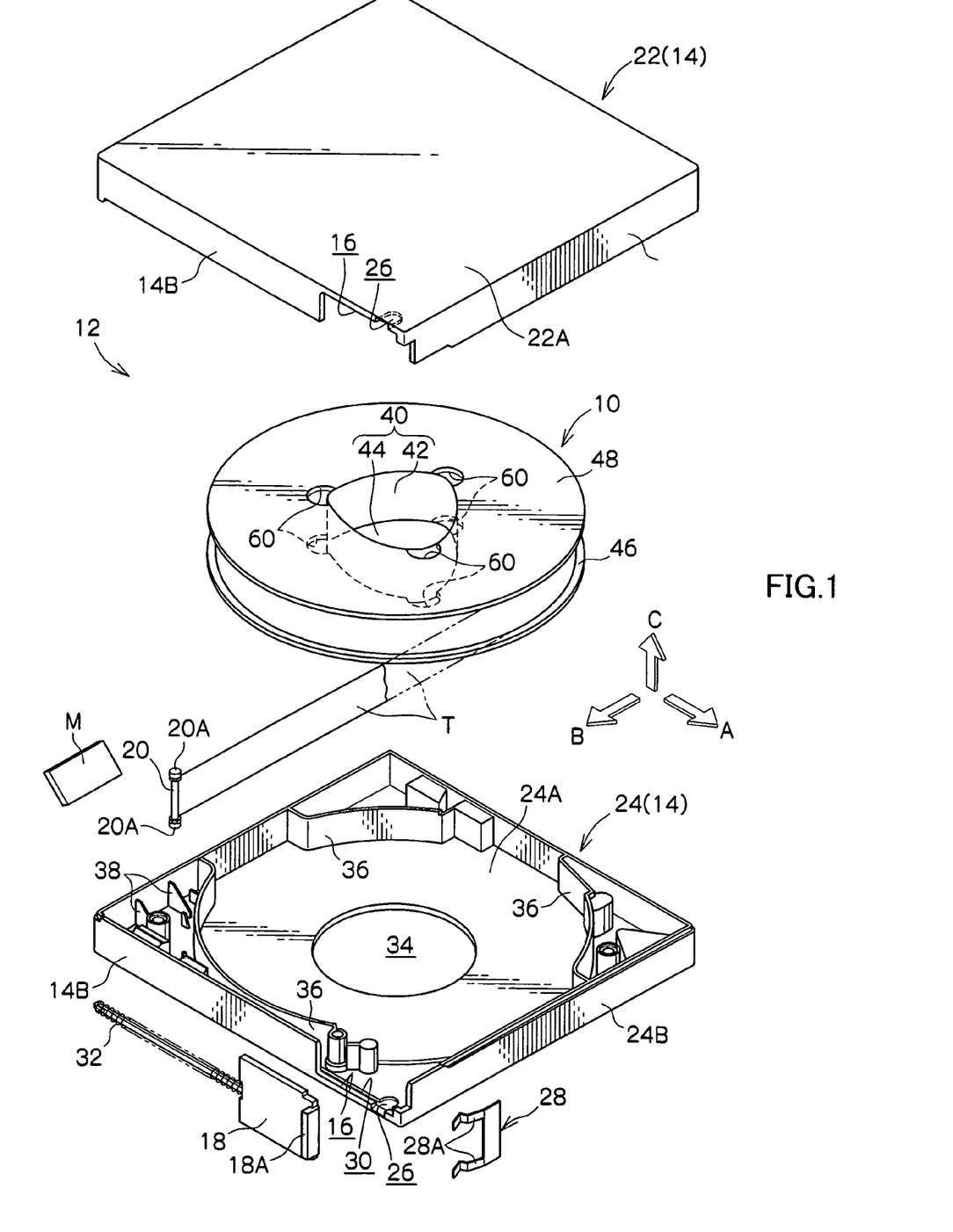
FIG. 1 is an exploded perspective view showing the overall configuration of a recording tape cartridge pertaining to an embodiment of the invention.

FIG. 1 shows an exploded perspective view of the recording tape cartridge 12. The recording tape cartridge 12 includes a case 14 that is substantially rectangular in plan view. A single reel 10, onto which magnetic tape T serving as an information recording and playback medium (recording tape) is wound, is rotatably housed inside the case 14.

An opening 16 for pulling the magnetic tape T outside the case 14 is disposed in a front-direction end portion of a right side wall of the case 14. The opening 16 is configured such that it is closed off by a door 18 when the recording tape cartridge 12 (the magnetic tape T) is not in use and is opened inside the drive device when the recording tape cartridge 12 is in use.

Further, a leader pin 20 that is a leader member is attached to the leading end of the magnetic tape T. The leader pin 20 is formed in a small circular column-like shape and includes flange portions 20A that are disposed on both longitudinal-direction ends of the leader pin 20 and protrude further upward and downward than the width-direction end portions of the magnetic tape T. When the recording tape cartridge 12 is in use, the flange portions 20A become caught on a pullout member of the drive device such that the magnetic tape is pulled out from the case 14.

The case 14 is configured as a result of an upper case 22 and a lower case 24 being joined together. The upper case 22 is configured by a top plate 22A, which is substantially rectangular in plan view, and a substantially frame-like peripheral wall 22B, which stands along the outer edge of the top plate 22A. The lower case 24 is configured by a bottom plate 24A, which has a shape substantially corresponding to the shape of the top plate 22A, and a peripheral wall 24B, which stands along the outer edge of the bottom plate 24A. Additionally, the case 14 is formed in a substantial box-like shape as a result of the upper case 22 and the lower case 24 being joined together, by ultrasonic welding or with screws, in a state where the open end of the peripheral wall 22B and the open end of the peripheral wall 24B have been brought into contact with each other.

The opening 16 is formed in a substantially rectangular shape in side view and opens rightward (in the direction of arrow B) at the front-direction end portion of a right side wall 14B (right side wall of the case 14 configured by the peripheral wall 22B and the peripheral wall 24B) of the case 14, the right side wall 14b is positioned along the direction of arrow A. Pin receiving recess portions 26 that accommodate the flange portions 20A of the leader pin 20 are disposed in the top plate 22A and the bottom plate 24A. Each of the pin receiving recess portions 26 opens rightward in the vicinity of the front end of the opening 16 and enables the leader pin 20 to enter and exit the case 14 through the opening 16.

Further, a plate spring 28 is attached in the vicinity of the front end of the case 14, and upper and lower arms 28A are disposed on the plate spring 28. The plate spring 28 causes the leading ends of the arms 28A to engage with the flange portions 20A of the leader pin 20 and retain the leader pin 20 with respect to the case 14. The leader pin 20 is released from this retained state as a result of being pulled in the right direction with a force equal to or greater than a predetermined value.

The door 18 that opens and closes the opening 16 is formed in a substantially rectangular tabular shape that can close off the opening 16 by itself. The upper and lower end portions of the door 18 slidably enter guide grooves 30 that are disposed in the top plate 22A and the bottom plate 24A and are formed along the open surface of the opening 16 and the right side wall 14B.

Thus, the door 18 is configured to be selectively movable between a closed position where the door 18 closes off the opening 16 and an open position where the door 18 opens the opening 16 as a result of the door 18 sliding in the front and rear directions while being guided in the guide grooves 30. Additionally, the door 18 is biased in the front direction by a coil spring 32 that is a biasing member disposed between the door 18 and the case 14, and is ordinarily positioned in the closed position by the biasing force of the coil spring 32. An operational portion 18A is disposed on the front-direction end portion of the door 18 and protrudes in the right direction. The door 18 can be moved to the open position counter to the biasing force of the coil spring 32 by pushing the operational portion 18A rearward.

Further, a gear opening 34 for exposing a later-described reel gear 50 (see FIG. 3) of the reel 10 is disposed in the central portion of the bottom plate 24A of the case 14. When the recording tape cartridge 12 is in use, the reel 10 is rotatingly driven, in a state of non-contact inside the case 14, when a drive gear of the drive device meshes with the reel gear 50 and rotates.

Moreover, the case 14 includes guidance regulation walls 36 that sectionally stand from the top plate 22A and the bottom plate 24A along a circumference coaxial with the gear opening 34 and are configured as a result of their upper and lower ends being brought into contact with each other. The guidance regulation walls 36 suppress chattering of the reel 10. End portions of the guidance regulation walls 36 are continuous with the peripheral walls 22B and 24B, and the guidance regulation walls 36 prevent dust and the like from ingressing into the region where the reel 10 is disposed.

Further, a memory board M, in which various information for each recording tape cartridge 12 is stored, is disposed in the right side rear corner portion inside the case 14. The memory board M is supported by a pair of support ribs 38 such that the memory board M slants substantially 45° with respect to the bottom plate 24A, in order to enable communication with the drive device that communicates from the underside and a library device that communicates from the rear side. That is, the support ribs 38 are configured such that their upper edges, which are the surfaces that support the memory board M, slant a predetermined angle (in the present embodiment, 45°).

(Configuration of the Reel)

Figure 2A:
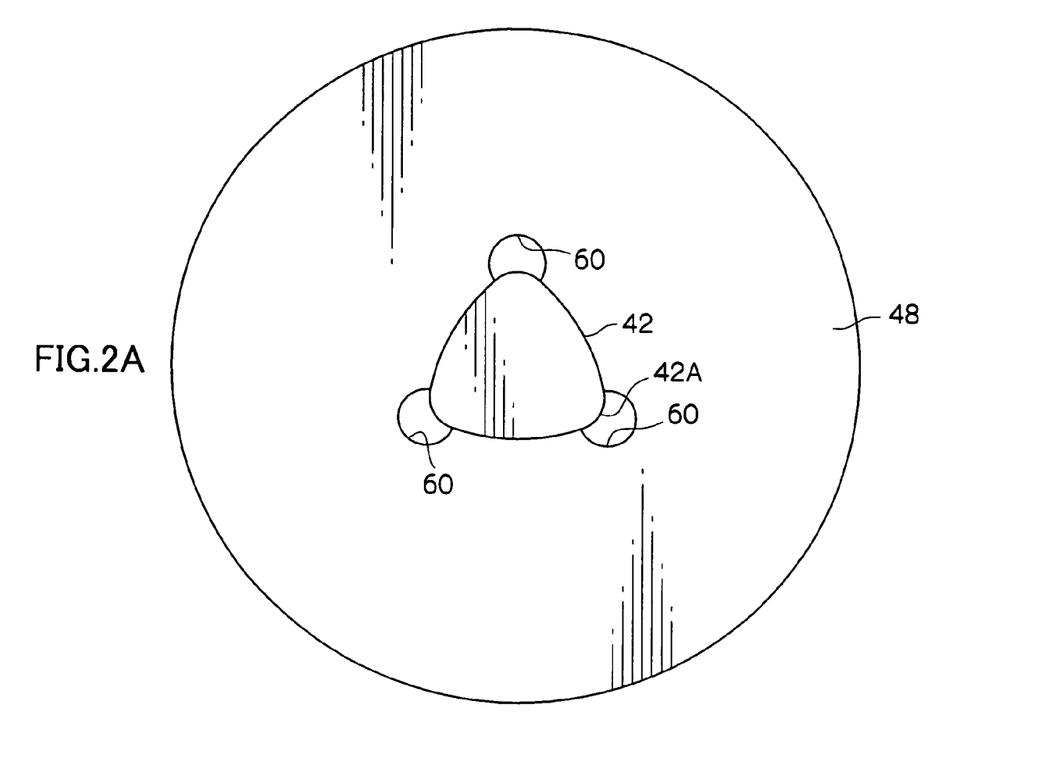
FIG. 2A is a schematic plan view of a reel pertaining to an embodiment of the invention.
Figure 3:
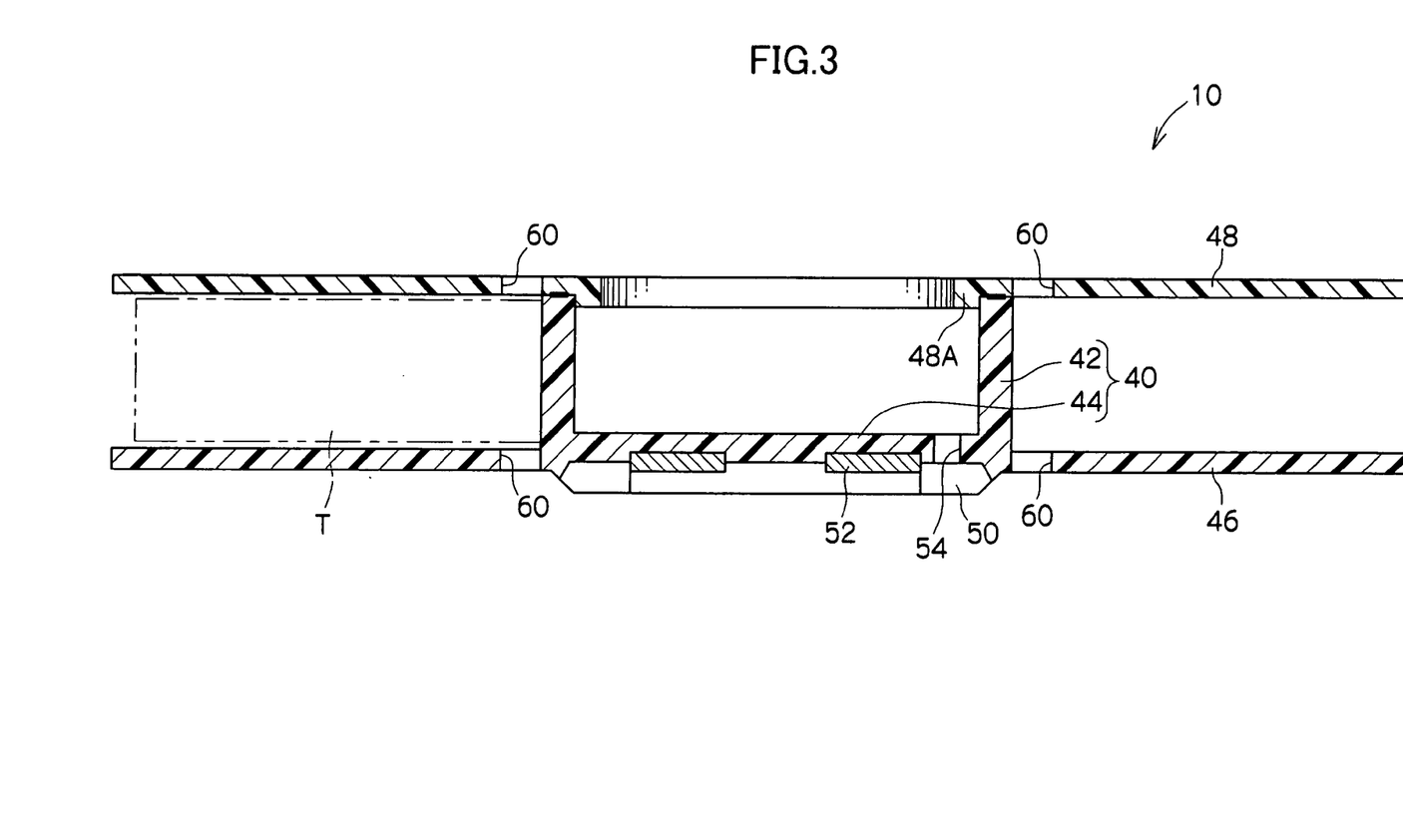
FIG. 3 is a cross-sectional view showing a reel pertaining to an embodiment of the invention.

FIG. 3 shows a cross-sectional view of the reel 10. The reel 10 is disposed with a hub 40 that configures the axial center portion of the reel 10, and the cross section of the hub 40 in plan view has a substantially equilateral triangular shape as shown in FIG. 2A. The hub 40 includes a triangular cylinder 42, on whose outer peripheral surface the magnetic tape T is wound, and a bottom portion 44 (one end side of the hub 40), which closes off the lower portion of the triangular cylinder 42. The upper portion of the hub 40 is open.

A lower flange 46 protrudes coaxially and integrally outward in the radial direction of the reel 10 from the outer periphery of the lower portion 44 of the hub 40. An upper flange 48, whose outer diameter is the same as the outer diameter of the lower flange 46, is coaxially joined together with the upper end portion of the hub 40 by ultrasonic welding or the like.

A short cylinder portion 48A, which is fitted inside the triangular cylinder 42 and whose cross section in plan view has a substantially equilateral triangular shape, is formed in the axial center portion of the upper flange 48 and is ultrasonically welded to the upper end surface of the triangular cylinder 42 in a state where the short cylinder portion 48A has been fitted inside the triangular portion 42.

The reel 10 is configured such that the magnetic tape T is wound onto the outer peripheral surface of the triangular cylinder 42 (the hub 40) between the lower flange 46 and the upper flange 48. Additionally, the lower flange 46 and the upper flange 48 regulate positional displacement, in the width direction (axial line direction of the hub 40), of the magnetic tape T wound onto the hub 40.

Figure 2B:
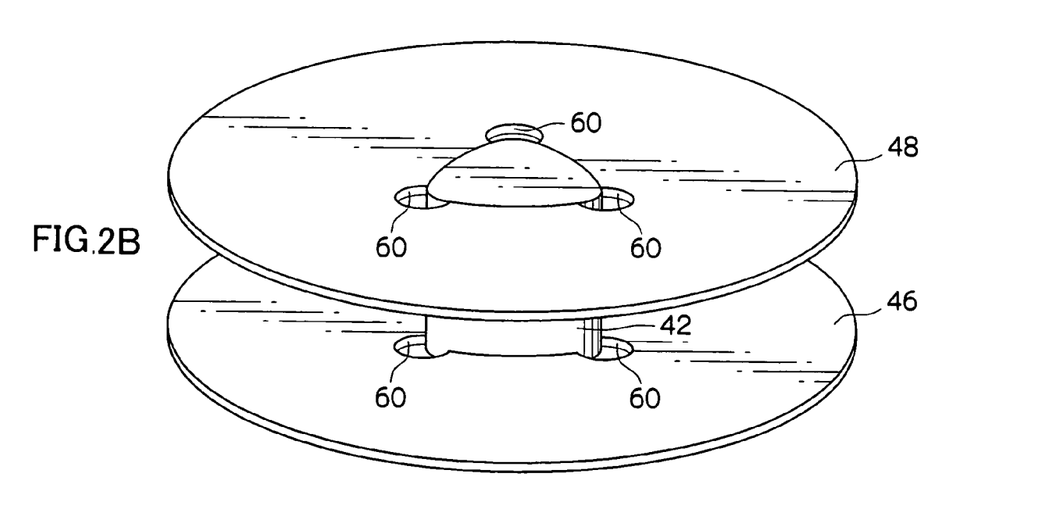
FIG. 2B is a schematic perspective view of a reel pertaining to an embodiment of the invention.

Here, as shown in FIG. 1 and FIGS. 2A and 2B, corner portions 42A of the triangular cylinder 42 are rounded such that the magnetic tape T wound onto the outer peripheral surface of the triangular cylinder 42 does not sustain damage. Further, cutout portions 60, which locally divide the upper flange 48 and the hub 40 or the lower flange 46 and the hub 40, are formed at portions in the upper flange 48 and the lower flange 46 continuous with the triangular cylinder 42. The portions where the cutout portions 60 are formed in the upper flange 48 and the lower flange 46 correspond to the corner portions 42A of the triangular cylinder 42.

The reel gear 50, which is annularly formed, is disposed in the vicinity of the outer periphery of the outer surface (undersurface) of the bottom portion 44 of the hub 40 as shown in FIG. 3. When the recording tape cartridge 12 is in use, the reel gear 50 is exposed through the gear opening 34 of the case 14 and relatively moves along the axial line direction with respect to a rotating shaft of the drive device, whereby the reel gear 50 meshes with, and disengages from, the drive gear disposed on a leading end of the rotating shaft.

Further, a reel plate 52 comprising magnetic material is integrally disposed, by insert molding, on the radial-direction inner side of the reel gear 50 in the undersurface of the bottom portion 44. The reel plate 52 is configured such that it is attracted and retained without contact by a magnet disposed on the leading end of the rotating shaft of the drive device.

Moreover, an unillustrated lock mechanism for inhibiting the rotation of the reel 10 when the magnetic tape T is not in use is disposed at the inner side of the hub 40. The lock mechanism includes a lock member that does not rotate with respect to the case, and supports the lock member such that the lock member is movable toward and away from the bottom portion 44 of the reel 10.

Further, the lock member is configured to be movable, as a result of moving toward and away from the bottom portion 44, between a rotation lock position where the lock member engages with an engagement portion (not shown) of the bottom portion 44 and inhibits the rotation of the reel 10 with respect to the case 14 and a release position where the lock member disengages from the engagement portion and allows the rotation of the reel 10.

For this reason, the engagement portion with which the lock member engages is disposed in the bottom portion 44, and an operational hole 54 is formed in the bottom portion 44 for a lock release member of the drive device to operate the lock member from the outside. In the present embodiment, a configuration is shown where the operational hole 54 is disposed in the site where the reel gear 50 is formed, but the operational hole 54 may also be disposed in the axial center portion of the bottom portion 44, for example.

As described above, the bottom portion 44 of the hub 40 is configured to fulfill the function that rotational force is transmitted from the drive device with the reel gear 50 formed, the function of closing off the gear opening 34 of the case 14 when the recording tape cartridge 12 is not in use, and the function of causing the lock member to engage and inhibit the rotation of the reel 10 with respect to the case 14.

The hub 40, whose bottom portion 44 that fulfills various functions in this manner closes off the lower end of the triangular cylinder 42 (protrudes inward in the radial direction from the lower end), is configured such that its lower end side is stronger (more rigid) with respect to the winding pressure of the magnetic tape T than its upper end side, which is the open end, as a result of the reinforcing effect of the bottom portion 44.

Next, the action of the embodiment of the present invention will be described.

When the recording tape cartridge 12 is loaded into the drive device in order to record information on the magnetic tape T or play back information recorded on the magnetic tape T, the rotational lock on the reel 10 with respect to the case 14 is released, the rotating shaft (drive gear) of the drive device meshes with the reel gear 50 of the reel 10, and the reel 10 rotates inside the case 14 as a result of the rotating shaft rotation.

At this time, the leader pin 20 that has already been taken out through the opening 16 is retained on the take-up reel of the drive device, and the take-up reel rotates in synchronization with the reel 10, whereby the magnetic tape T is sequentially pulled out from the case 14. Then, a recording and playback head disposed along a predetermined tape path writes information on the magnetic tape T or reads information recorded on the magnetic tape T. After the magnetic tape T has been used, the reel 10 returns the magnetic tape T to its initial wound state.

Incidentally, it is experientially understood that the constricting force with respect to the hub 40 that arises as a result of the magnetic tape T being tightly wound onto the hub 40 reaches a substantial maximum at three points positioned equidistantly in the circumferential direction of the hub 40. For this reason, the cross-sectional outer shape of the hub 40 is formed in a substantially equilateral triangular shape and the points where the constricting force resulting from the magnetic tape T reaches a maximum are caused to protrude in advance to counteract deformation of the hub 40 resulting from the constricting force. In other words, the shape of the hub 40 is brought close to a circular cylinder shape from a triangular cylinder shape by the constricting force of the magnetic tape T. Thus, bending deformation of the central portion of the hub 40 can be deterred.

Additionally, by disposing the cutout portions 60 around the corner portions 42A of the triangular cylinder 42, deformation of the upper flange 48 and the lower flange 46 is also deterred because it becomes difficult for the constricting force acting on the corner portions 42A to be transmitted to the upper flange 48 and the lower flange 46.

Thus, stable travel of the magnetic tape T can be obtained without the edge portions of the traveling magnetic tape T sustaining damage due to the upper flange 48 and the lower flange 46. Further, there is also little potential for the manufacturing cost to increase because deformation of the upper flange 48 and the lower flange 46 is deterred as a result of simply forming the cutout portions 60 in the upper flange 48 and the lower flange 46.

Figure 4A:
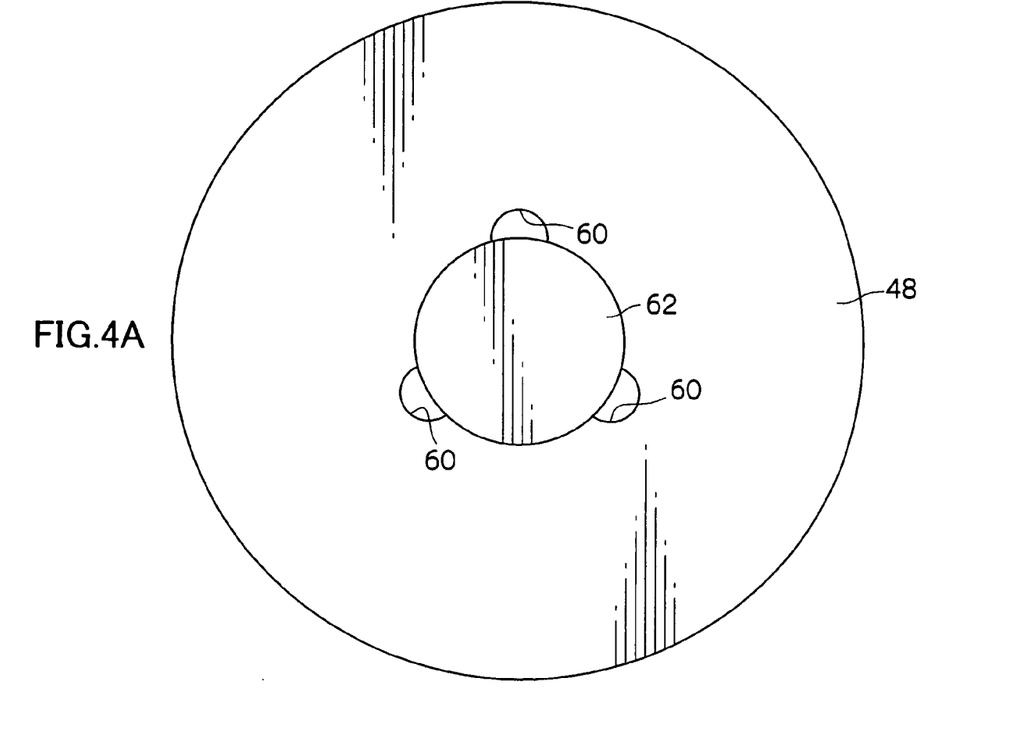
FIG. 4A is a schematic plan view showing a modification of a reel pertaining to an embodiment of the invention.
Figure 4B:
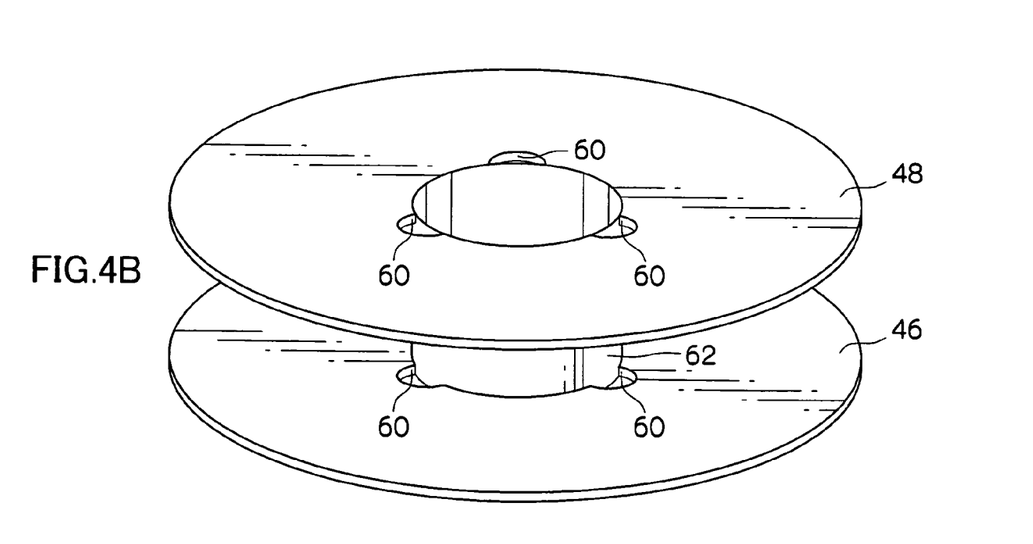
FIG. 4B is a schematic perspective view showing a modification of the reel pertaining to an embodiment of the invention.

Here, the cross-sectional outer shape of the hub 40 is formed in a substantially equilateral triangular shape and the three points where the constricting force resulting from the magnetic tape T reaches a maximum are caused to protrude in advance, but it is not invariably necessary for there to be three points; there may also be two points. Further, it is not necessary for the cross-sectional outer shape of the hub 40 to have a substantially equilateral triangular shape. For example, as shown in FIGS. 4A and 4B, the hub 62 may also have a circular cylinder shape. Although it is not illustrated, the hub 62 may also have a regular polygonal shape other than an equilateral triangular shape.

Further, here, by disposing the cutout portions 60 that locally divide the hub 40 and the upper flange 48 or the lower flange 46, it becomes difficult for the constricting force resulting from the magnetic tape T to be transmitted to the upper flange 48 and the lower flange 46, but the means of making it difficult for the constricting force to be transmitted to the upper flange 48 and the lower flange 46 are not limited to the cutout portions 60.

Figure 5A:
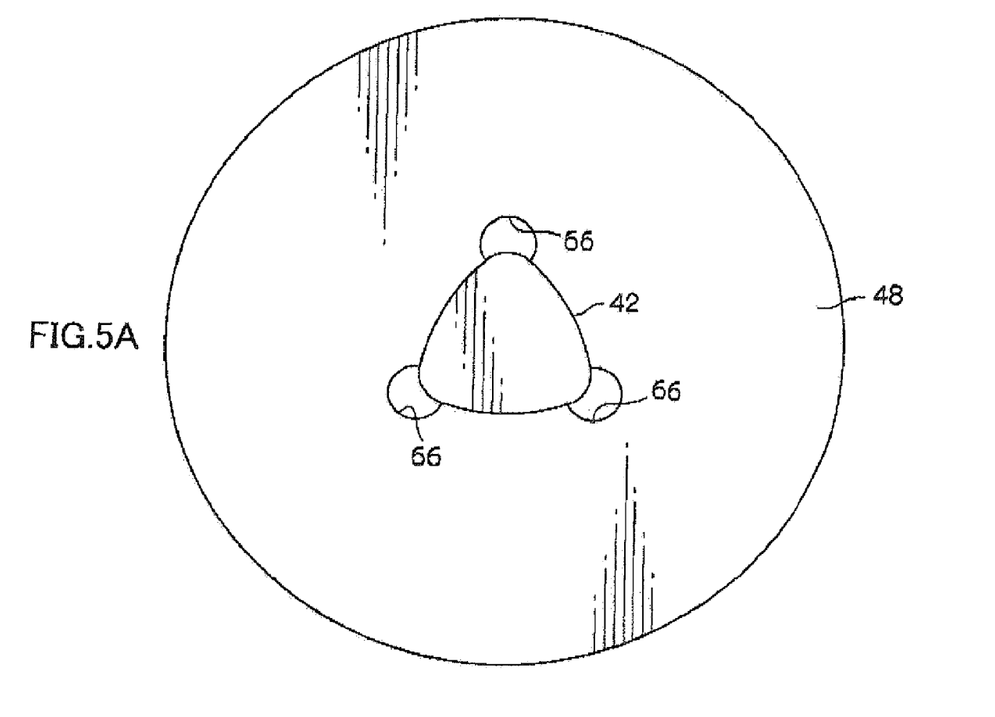
FIG. 5A is a schematic plan view showing another modification of a reel pertaining to an embodiment of the invention.
Figure 5B:
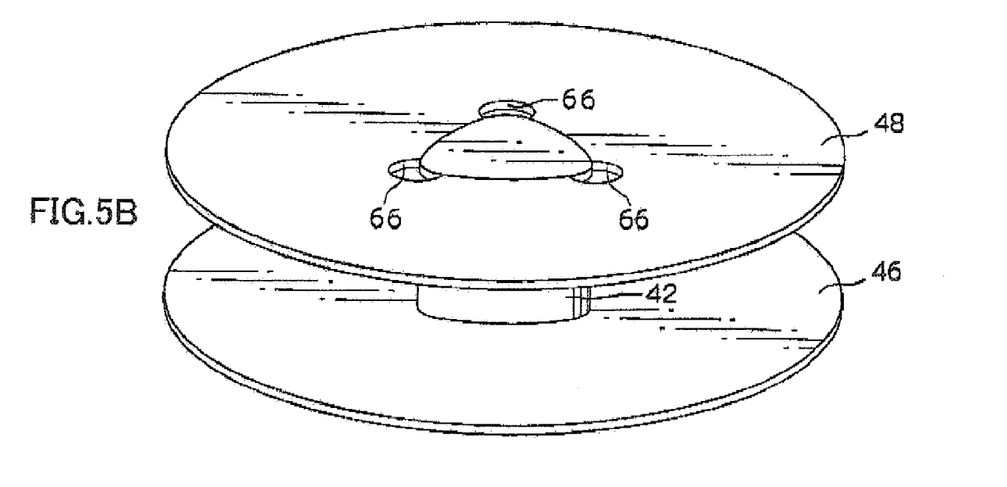
FIG. 5B is a schematic perspective view showing the other modification of a reel pertaining to an embodiment of the invention.

For example, as shown in FIGS. 5A and 5B, instead of the cutout portions 60 that penetrate the upper flange 48 or the lower flange 46, thin-walled portions 66 at which the thickness of the upper flange 48 or the lower flange 46 is locally reduced may also be disposed in the upper flange 48 or the lower flange 46. In this case, it is preferable for the thickness of the thin-walled portions 66 to be ¼ to ½ the thickness of the upper flange 48 or the lower flange 46.

Moreover, in the preceding embodiment, an example has been described where the lower flange 46 is formed integrally with the hub 40, but the present invention is not limited to this. The invention may also be configured such that the lower flange 46 is formed separately from the hub 40 and fixed to the lower end portion of the hub 40.

Further, in the preceding embodiment, an example has been described where the reel 10 is applied to the recording tape cartridge 12 that is configured to house a single reel inside the case 14, but the present invention is not limited to this. For example, the reel 10 may also be applied to a 2-reel type of recording tape cartridge.

As described above, according to the embodiment of the present invention, because the hub and the flanges are locally divided by the cutout portions or the thin-walled portions formed in the flanges, it becomes difficult for the constricting force resulting from the tight winding of the recording tape acting on the hub to be transmitted to the flanges. For this reason, deformation of the flanges can be deterred, and the width-direction end portions of the recording tape can be prevented from being damaged by deformed flanges. Further, there is little potential for the manufacturing cost to increase because the cutout portions or the thin-walled portions are simply formed in the flanges.

According to the embodiment of the present invention, the cross section of the hub in plan view is formed in a substantially equilateral triangular shape, the positions where the constricting force resulting from the recording tape reaches a maximum are caused to protrude in advance, and the shape of the hub is brought closer to a circular cylinder shape from the substantially equilateral triangular shape by the constricting force of the recording tape. Thus, bending deformation of the central portion of the hub can be deterred. Moreover, by rounding the corner portions of the substantially equilateral triangular shape of the hub, it can be ensured that the recording tape wound onto the hub does not sustain damage.

The foregoing description of the embodiment of the present invention has been provided for the purposes of illustration and description. It is not intended to be exhaustive or to limit the invention to the precise forms disclosed. Obviously, many modifications and variations will be apparent to practitioners skilled in the art. It is intended that the scope of the invention be defined by the following claims and their equivalents.

What is claimed is:

1. A reel comprising:
   a hub onto which recording tape is wound; and
   a flange that is disposed on an end portion of the hub and retains a width-direction end portion of the recording tape,
   wherein plural cutout portions that locally divide the hub and the flange are formed in the flange,
   wherein a cross section of the hub in plan view has a substantially regular polygonal shape, corner portions of the substantially regular polygon are rounded, and the cutout portions are disposed around the corner portions.

2. The reel of claim 1, wherein the flange is disposed on both end portions of the hub.

3. A recording tape cartridge provided with the reel of claim 1.

4. A reel comprising:
   a hub onto which recording tape is wound; and
   a flange that is disposed on an end portion of the hub and retains a width-direction end portion of the recording tape,
   wherein plural thin-walled portions, at which the thickness of portions is reduced, are formed in the flange at a location where the hub and the flange are connected to each other.

5. The reel of claim 4, wherein the cross section of the hub in plan view has a substantially regular polygonal shape, corner portions of the substantially regular polygon are rounded, and the thin-walled portions are disposed around the corner portions.

6. The reel of claim 4, wherein the flange is disposed on both end portions of the hub.

7. The reel of claim 4, wherein the cross section of the hub in plan view has a substantially regular polygonal shape, corner portions of the substantially regular polygon are rounded, and the thin-walled portions are disposed at positions in the flange corresponding to the corner portions.

8. The reel of claim 7, wherein the substantially regular polygonal shape is a substantially equilateral triangular shape.

9. A recording tape cartridge provided with the reel of claim 4.

10. A reel comprising:
    a hub onto which recording tape is wound; and
    a flange that is disposed on an end portion of the hub and retains a width-direction end portion of the recording tape,
    wherein plural cutout portions that locally divide the hub and the flange are formed in the flange,
    wherein the cross section of the hub in plan view has a substantially regular polygonal shape, corner portions of the substantially regular polygon are rounded, and the cutout portions are disposed at positions in the flange corresponding to the corner portions.

11. The reel of claim 10, wherein the substantially regular polygonal shape is a substantially equilateral triangular shape.

* * * * *